United States Patent [19]
Byrne

[11] Patent Number: 6,042,426
[45] Date of Patent: Mar. 28, 2000

[54] MULTI-USER ELECTRICAL SERVICES OUTLET

[76] Inventor: Norman R. Byrne, 2736 Honey Creek, NE., Ada, Mich. 49301

[21] Appl. No.: 08/968,281

[22] Filed: Nov. 12, 1997

Related U.S. Application Data

[60] Provisional application No. 60/030,849, Nov. 13, 1996.

[51] Int. Cl.[7] .................................................. H01R 25/00
[52] U.S. Cl. ........................ 439/654; 439/650; 439/131
[58] Field of Search ................................ 439/131, 501, 439/535, 536, 623, 709, 712, 654, 650, 651, 652, 638; 361/226

[56] References Cited

U.S. PATENT DOCUMENTS

| | | |
|---|---|---|
| D. 78,966 | 7/1929 | Conner . |
| D. 122,497 | 9/1940 | McCarthy . |
| D. 325,723 | 4/1992 | Gary et al. . |
| D. 355,890 | 2/1995 | Lentz . |
| D. 366,865 | 2/1996 | Stringer . |
| 2,907,813 | 6/1959 | Hudson . |
| 3,209,209 | 9/1965 | Mueller . |
| 3,542,237 | 11/1970 | Butler . |
| 3,756,447 | 9/1973 | Hadfield . |
| 4,044,908 | 8/1977 | Dauberger . |
| 4,240,688 | 12/1980 | Sotolongo . |
| 4,266,266 | 5/1981 | Sanner . |
| 4,323,723 | 4/1982 | Fork et al. . |
| 4,470,656 | 9/1984 | Moser et al. . |
| 5,073,120 | 12/1991 | Lincoln et al. . |
| 5,164,544 | 11/1992 | Snodgrass et al. . |
| 5,178,555 | 1/1993 | Kilpatrick et al. . |
| 5,195,288 | 3/1993 | Penczak . |
| 5,231,562 | 7/1993 | Pierce et al. . |
| 5,516,298 | 5/1996 | Smith ...................................... 439/131 |
| 5,518,417 | 5/1996 | Liu . |

*Primary Examiner*—Paula Bradley
*Assistant Examiner*—Alexander Gilman
*Attorney, Agent, or Firm*—Varnum, Riddering, Schmidt & Howlett LLP

[57] ABSTRACT

A multi-user services module (10) includes a housing portion (12) with a hemispherical configuration. The hemispherical housing portion (12) is integrally molded to a depending cylindrical housing portion (14). The cylindrical housing portion (14) is fitted into an opening in a conference table (19) or the like. Power receptacles (20) and data receptacles (22) are molded and installed in the hemispherical housing portion (12).

1 Claim, 7 Drawing Sheets

MULTI-USER ELECTRICAL SERVICES OUTLET

This application claims the benefit of U.S. Provisional No. 60/030,849 filed Nov. 13, 1996.

BACKGROUND OF THE INVENTION

1. Field of the Invention

This invention relates to electrical services outlets, and more particularly to a multi-user electrical services outlet for supplying power to electrical devices such as computers, printers, facsimile machines, etc., and for transferring data between electrical devices.

2. Description of Related Art

It is common during business meetings, presentations and other sessions for those present to be seated around a conference table. With the advent of portable laptop computers and other accessories, the arduous tasks of note-taking, transferring information, etc., during meetings have been greatly simplified. However, when several people at a meeting are simultaneously using computers and other equipment, it is often difficult for multiple users to access the power and/or data outlets, since there may be more users than outlets, and since the outlets may be located remotely from the conference table. Power and data cords must often be extended across pathways normally used for walking. The maze of power and data cords strung along the floor and table is unsafe, unsightly, and distracting.

SUMMARY OF THE INVENTION

These and other problems of the prior art are overcome by the provision of a multi-user electrical services module that has outlets accessible at least from opposite sides thereof to provide power and/or data transfer capabilities between computer equipment. The module is supported on a work surface such as a conference table, etc., and also passes through an opening in the work surface.

According to one aspect of the invention, the power and data module includes a plurality of power outlets positioned on opposite sides of the module. A plurality of data outlets are positioned next to the power outlets and are also positioned on opposite sides of the power and data module.

According to a further aspect of the invention, the power and data module includes an opening for the passage of parallel or serial cables, telephone cords, etc., through the module. In one embodiment, the opening passes vertically through the center of the module. In another embodiment, a plurality of openings extend horizontally through the module at different locations around the module to a central opening.

BRIEF DESCRIPTION OF THE DRAWINGS

The invention will now be described with reference to the drawings in which.

DESCRIPTION OF THE PREFERRED EMBODIMENTS

Figure 2:
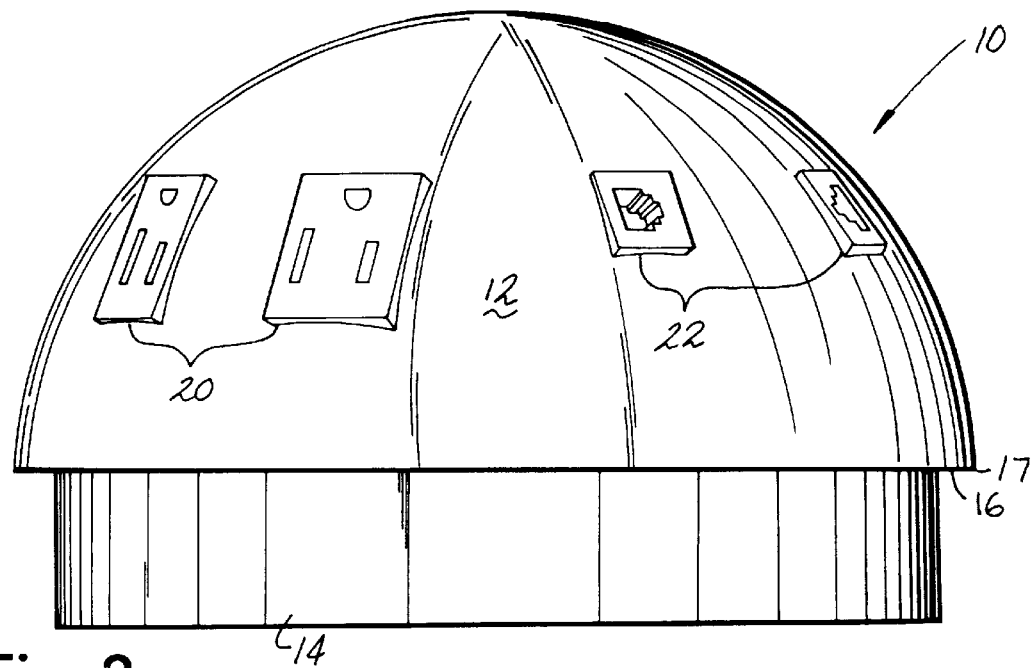
FIG. 2 is a side elevational view of the power and data module of FIG. 1.
Figure 1:
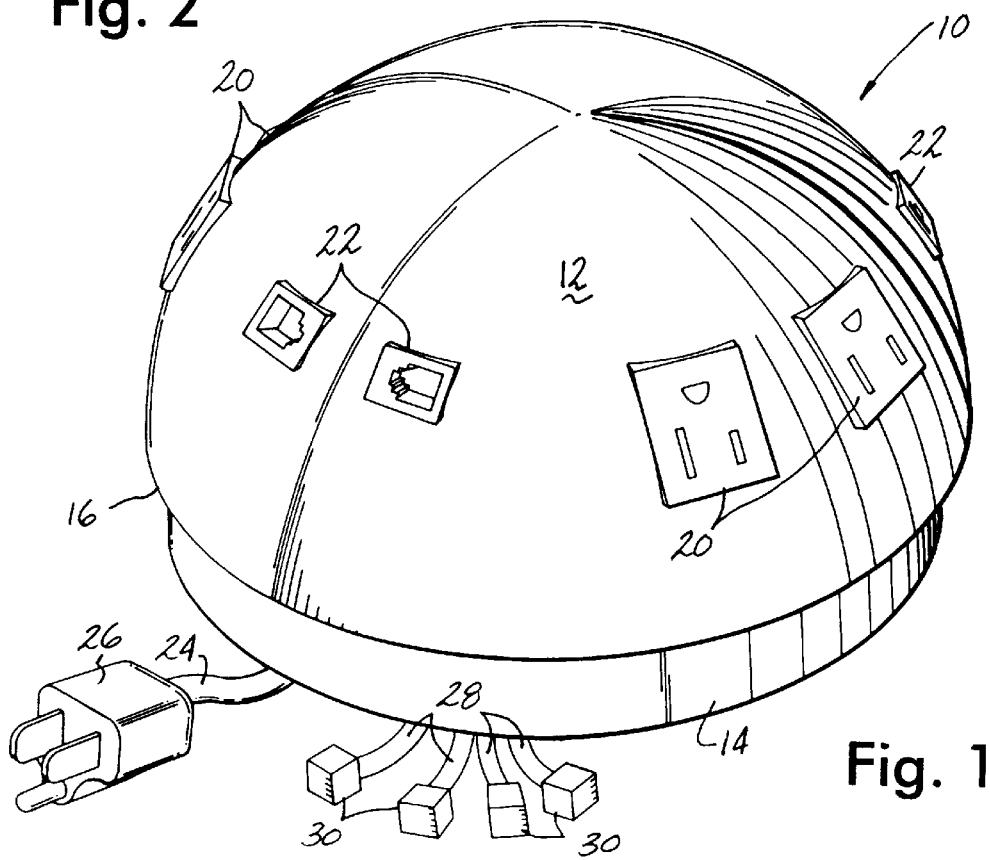
FIG. 1 is a perspective view of a power and data module according to invention.
Figure 3:
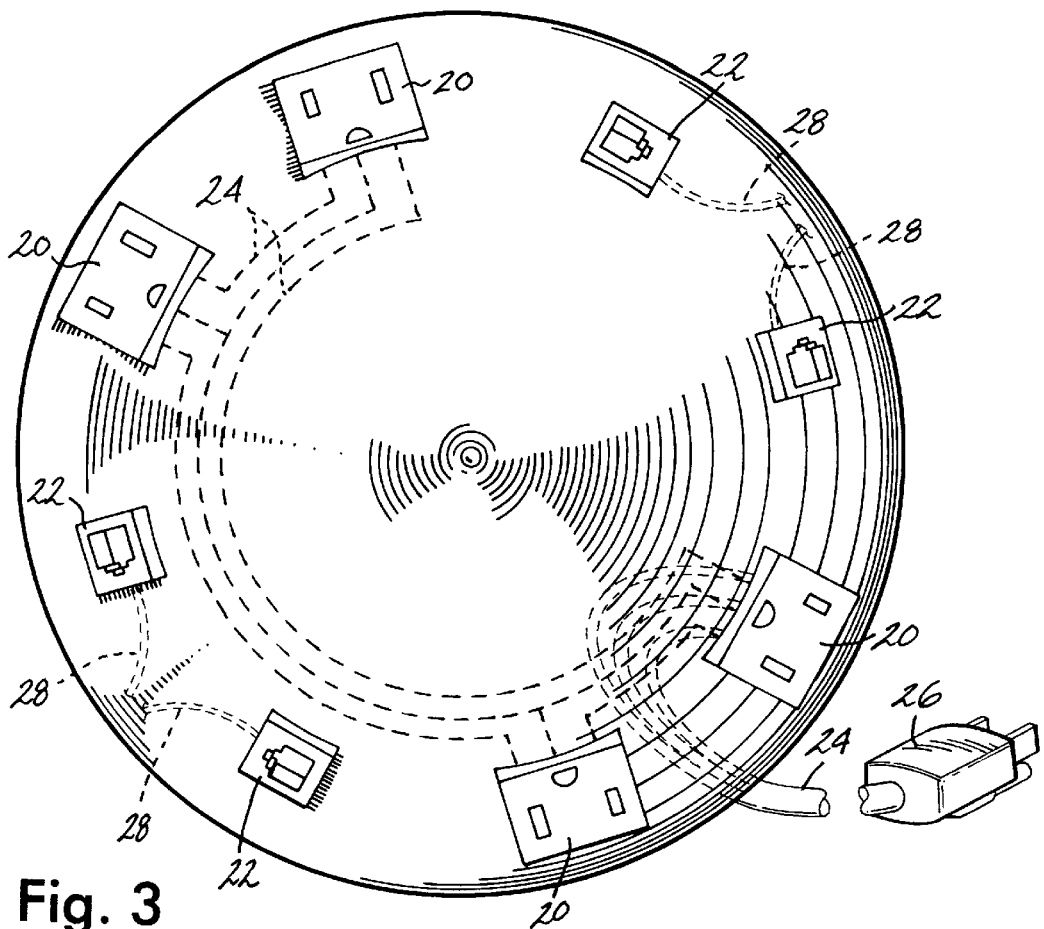
FIG. 3 is a top view of the power and data module of FIG. 1.
Figure 4:
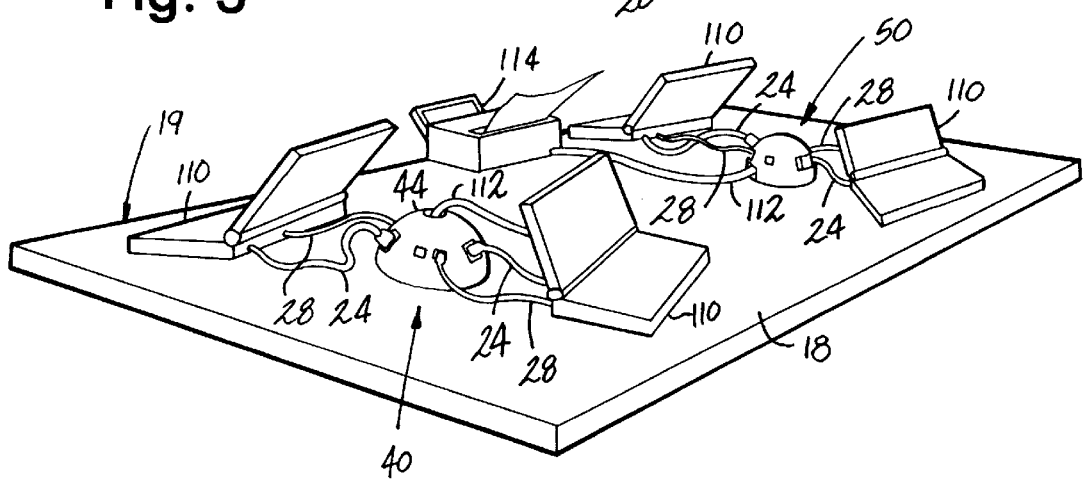
FIG. 4 is a perspective view of the power and data module installed in a conference table and connected to electrical equipment.

Referring now to the drawings and to FIGS. 1–3 in particular, a power and data module 10 features a hemispherical housing portion 12 integrally molded with a depending cylindrical housing portion 14. A horizontal support flange 16 extends between a lower circumferential edge 17 of the hemispherical housing 12 and an upper circumferential edge of the cylindrical housing 14. The housing portion 14 is adapted to fit within an appropriate sized opening in a conference table 19, desktop, or the like, as shown in FIG. 4. The support flange 16 is adapted to rest on a horizontal surface 18 when the power and data module 10 is installed.

Each module 10 includes a plurality of power receptacles 20 positioned on the hemispherical housing portion 12 at opposite sides thereof. Likewise, a pair of data receptacles 22 are positioned on the hemispherical housing portion 12 on opposite sides of the housing and adjacent to the power receptacles 20. The power and data receptacles 20, 22 are preferably integrally molded to the hemispherical housing 12. Alternatively, openings (not shown) can be formed in the housing 12 and power and data receptacles can be separately molded and installed in the openings. Although the housing portion 12 is shown as hemispherical, the use of other shapes having a plurality of sides, such as truncated pyramids, cones, etc., is contemplated. It is important that the power and data receptacles are accessible from all sides of the module 10.

With particular reference to FIG. 3, an electrical power cable 24 (shown in phantom line) is located within module 10 and preferably interconnects all of the power receptacles 20 on the module 10. An outlet plug 26 is also electrically connected to the power modules 20 for supplying electrical power thereto. Alternatively, each power module 20 or each pair of power modules may be connected to a separate plug 26 depending on the particular power requirements of any accessories attached thereto. For example, some highly sensitive electrical equipment may require surge protection, while other equipment may require different amounts of current or voltage. The power and data module 10 may therefore be equipped with well-known circuitry to provide proper surge protection to one or more of the power receptacles 20 and/or data receptacles 22. Each data receptacle 22 includes a data line 28 terminating in a line plug 30. Alternatively, a single data line may be provided for all of the data receptacles on the module 10. In this instance, a suitable multiplexer/demultiplexer (not shown) would be used to separate data transfer between multiple machines through a single data line.

Figure 6:
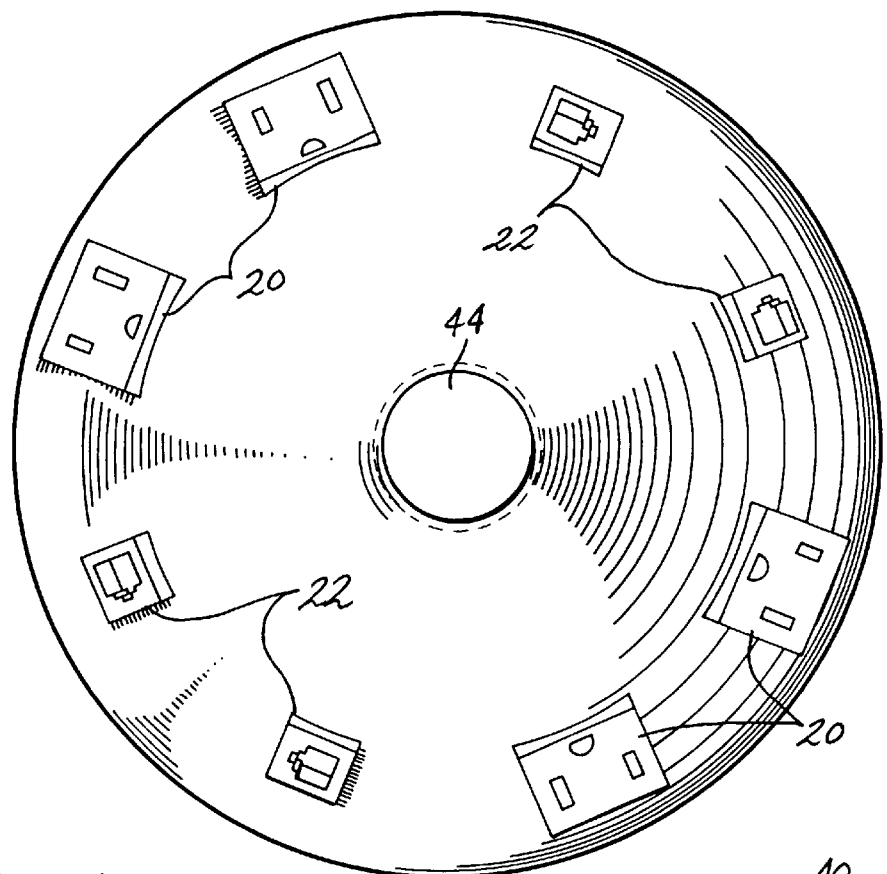
FIG. 6 is a top view of the power and data module of FIG. 5.
Figure 5:
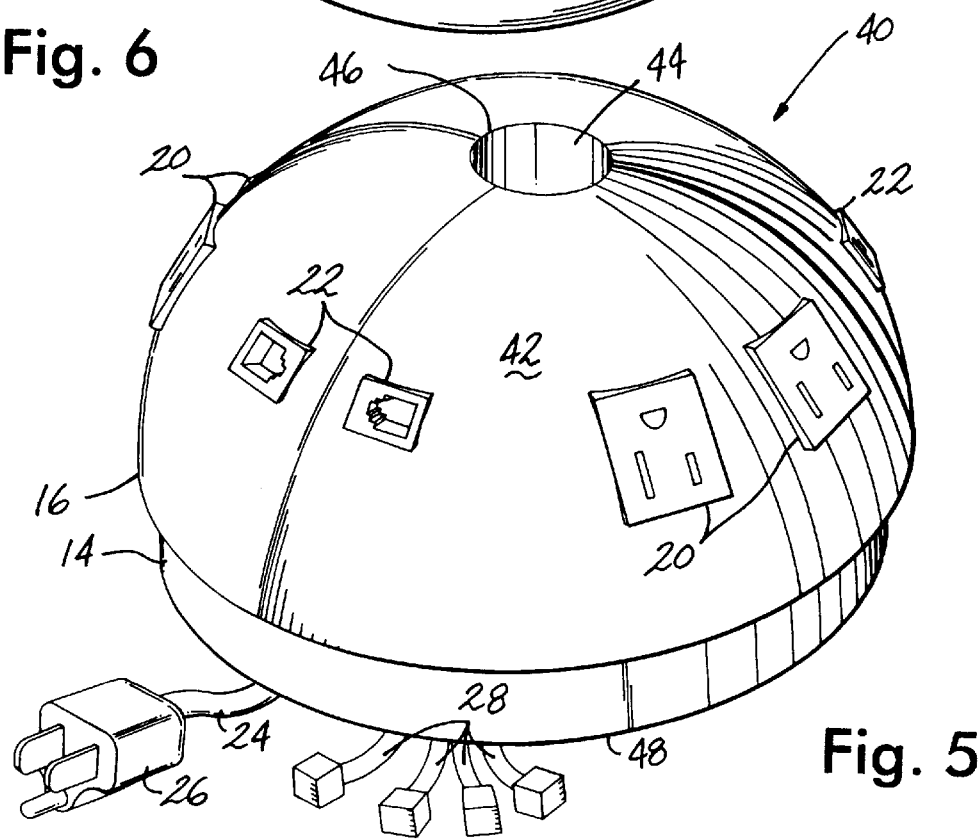
FIG. 5 is a perspective view of the power and data module according to a second embodiment of the invention.

Turning now to FIGS. 5 and 6, a power and data module 40 according to a second embodiment of the invention is shown, wherein like parts in the previous embodiment are represented by like numerals. The power and data module 40 includes a hemispherical housing portion 42 having a central opening 44 therein. The central opening 44 extends from the apex 46 of the housing portion 42 to a bottom surface 48 of the cylindrical housing portion 14. The central opening 44 is preferably large enough to enable passage of serial or parallel data cables, such as printer cables or the like, telephone or facsimile cords, etc. This feature advantageously prevents such cables or cords from being draped across pathways normally used for walking, etc., to remote devices.

Figure 8:
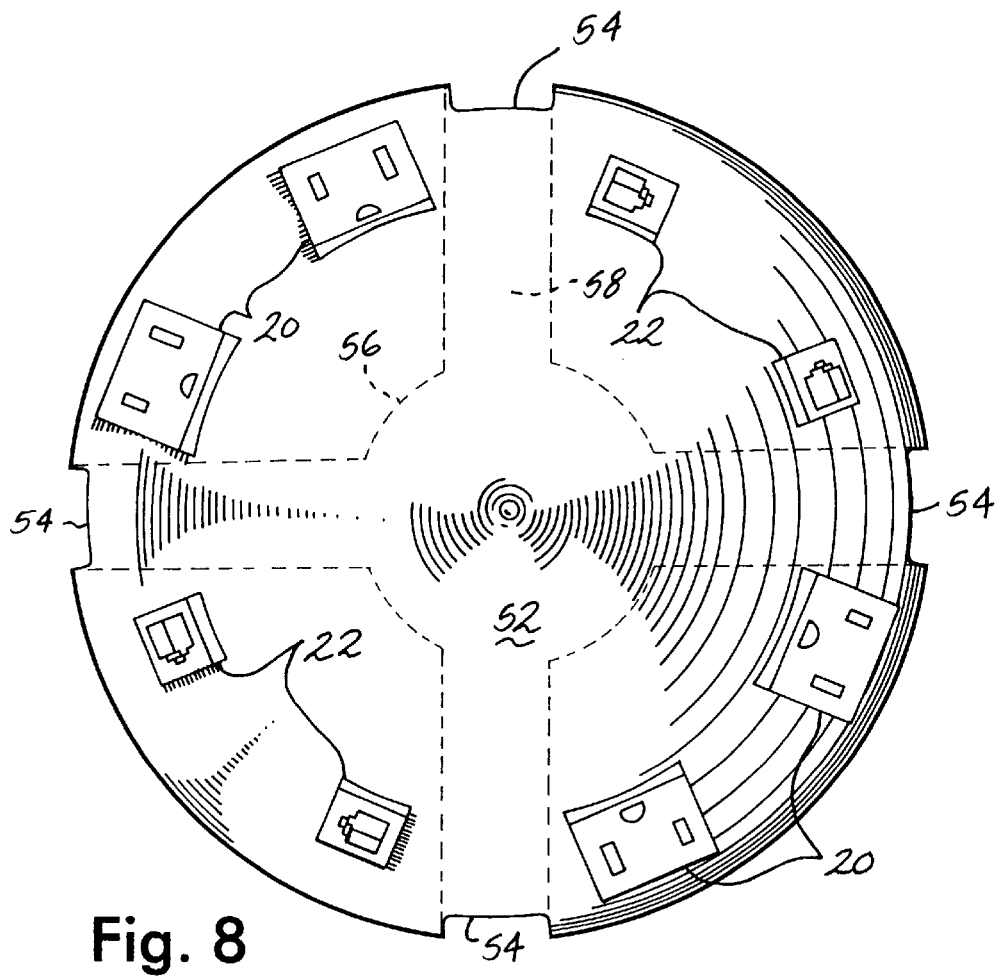
FIG. 8 is a top view of the power and data module of FIG. 6.
Figure 7:
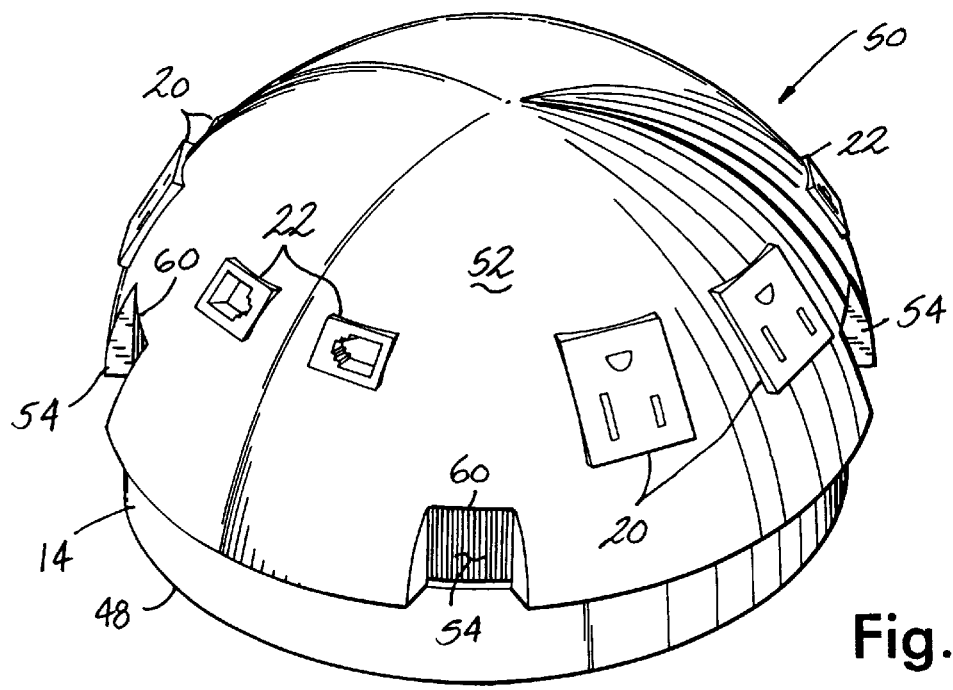
FIG. 7 is a perspective view of a power and data module according to a third embodiment of the invention.

Turning now to FIGS. 7 and 8, a power and data module 50 according to a third embodiment of the invention is shown, wherein like parts in the previous embodiments are represented by like numerals. The power and data module 50 includes a hemispherical housing portion 52 having a plurality of apertures 54 formed at a lower end of the housing 52. The apertures are preferably spaced around the periphery of the housing 52 at approximately 90° intervals. Each aperture 54 is connected to a central opening 56 (shown in hidden line in FIG. 8) via a trough 58 (shown in hidden line). The central opening 56 extends from the upper edge 60 of each trough 58 to a bottom surface 48 of the cylindrical housing portion 14. The apertures 54 are preferably large enough to enable passage of serial or parallel data cables, such as printer cables or the like, telephone or facsimile cords, etc. The provision of a plurality of apertures permits multiple users positioned around the module 50 to conveniently and neatly interconnect various electrical equipment. As in the previous embodiment, the provision of the apertures advantageously prevents cables or cords from being draped across pathways normally used for walking, etc., to remotely positioned devices.

Figure 9:
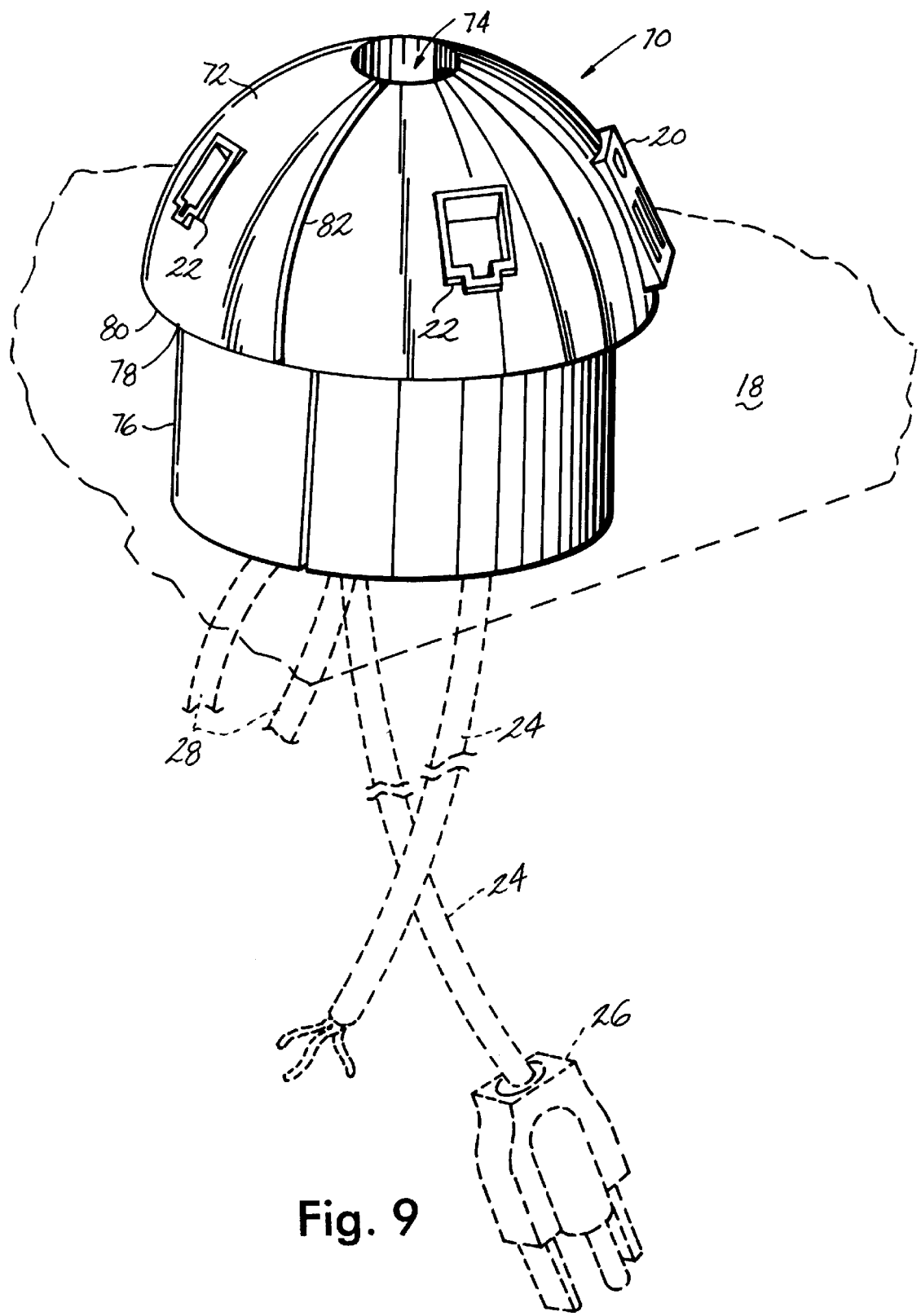
FIG. 9 is a perspective view of a power and data module according to a fourth embodiment of the invention.

FIG. 9 illustrates a power and data module 70 according to an even further embodiment of the invention, wherein like parts in the previous embodiments are represented by like numerals. The power and data module 70 is similar to the FIG. 5 embodiment, wherein a hemispherical housing portion 72 includes a central opening 74 sized for the passage of cables or cords therethrough. The hemispherical housing portion 72 is integrally molded with a depending cylindrical housing portion 76. A horizontal support flange 78 extends between a lower circumferential edge 80 of the hemispherical housing portion 72 and an upper circumferential edge of the cylindrical housing 76. The power and data module 70 in the present embodiment is preferably molded in two halves and joined at a seam 82. Each half includes a power receptacle 20, a data receptacle 22 and one half of the opening 74. It is to be understood, however, that any number of power and data receptacles can be provided depending on the particular needs of the end users. The halves may be assembled through mechanical fasteners, ultrasonic welding, adhesives, or other well known techniques. A power cable 24 and data line 28 are preferably associated with each module half. However, a single power cable and/or data line may be provided, as in the previous embodiments, for multiple receptacles.

Figure 10:
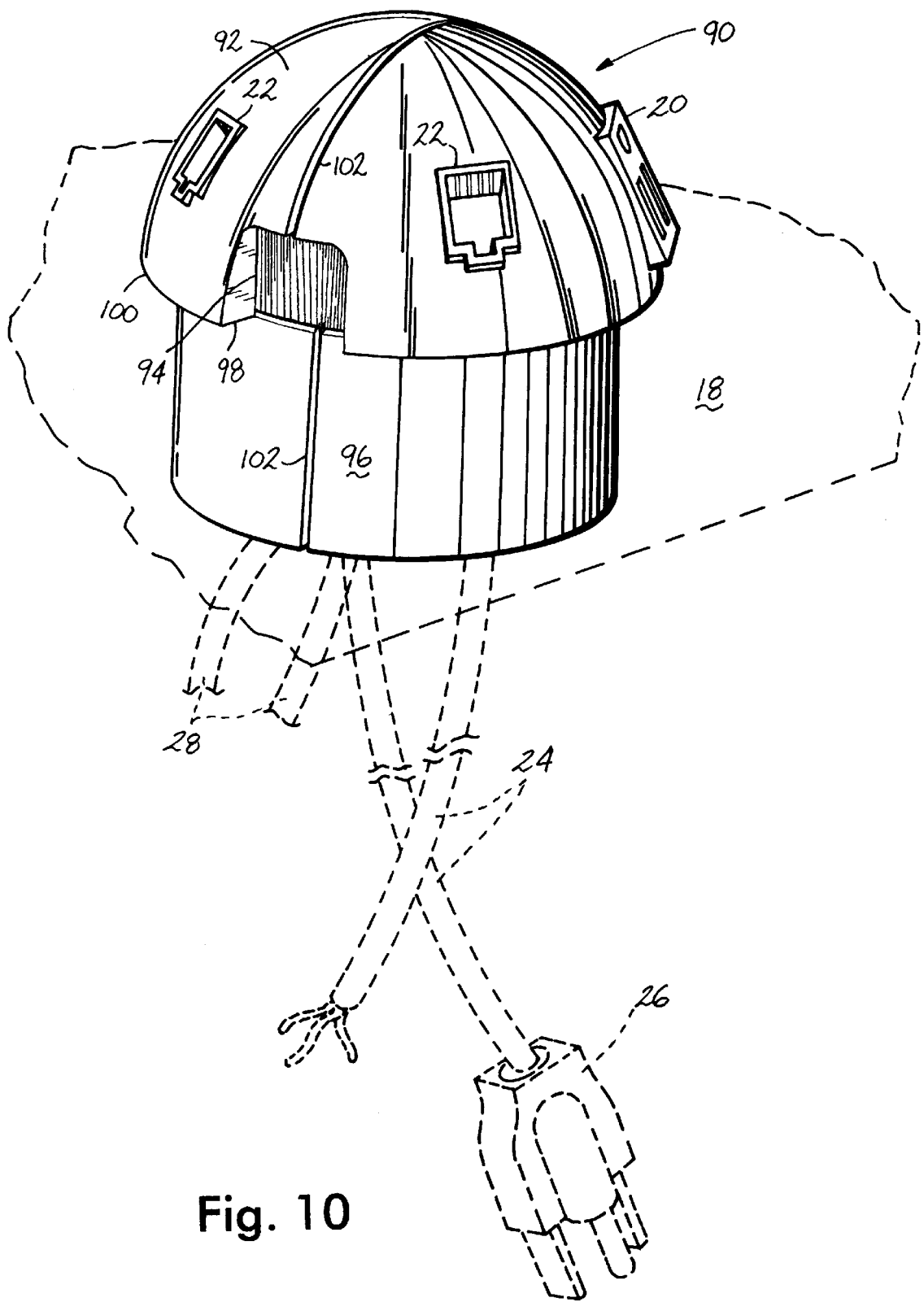
FIG. 10 is a perspective view of a power and data module according to a fifth embodiment of the invention.

FIG. 10 illustrates a power and data module 90 according to an even further embodiment of the invention, wherein like parts in the previous embodiments are represented by like numerals. The power and data module 90 is similar to the FIG. 7 embodiment, wherein a hemispherical housing portion 92 includes a pair of opposed apertures 94 (only one of which is illustrated) sized for the passage of cables or cords therethrough. The hemispherical housing portion 92 is integrally molded with a depending cylindrical housing portion 96. A horizontal support flange 98 extends between a lower circumferential edge 100 of the hemispherical housing portion 72 and an upper circumferential edge of the cylindrical housing 96. As in the previous embodiment, the power and data module 90 is preferably molded in two halves and joined at a seam 102. Each half includes a power receptacle 20, a data receptacle 22 and one half of each opposed aperture 94. It is to be understood, however, that any number of power and data receptacles and apertures can be provided depending on the particular needs of the end users. The halves may be assembled through mechanical fasteners, ultrasonic welding, adhesives, or other well known techniques. A power cable 24 and data line 28 are preferably associated with each module half. However, a single power cable and/or data line may be provided, as in the previous embodiments for multiple receptacles.

Figure 11:
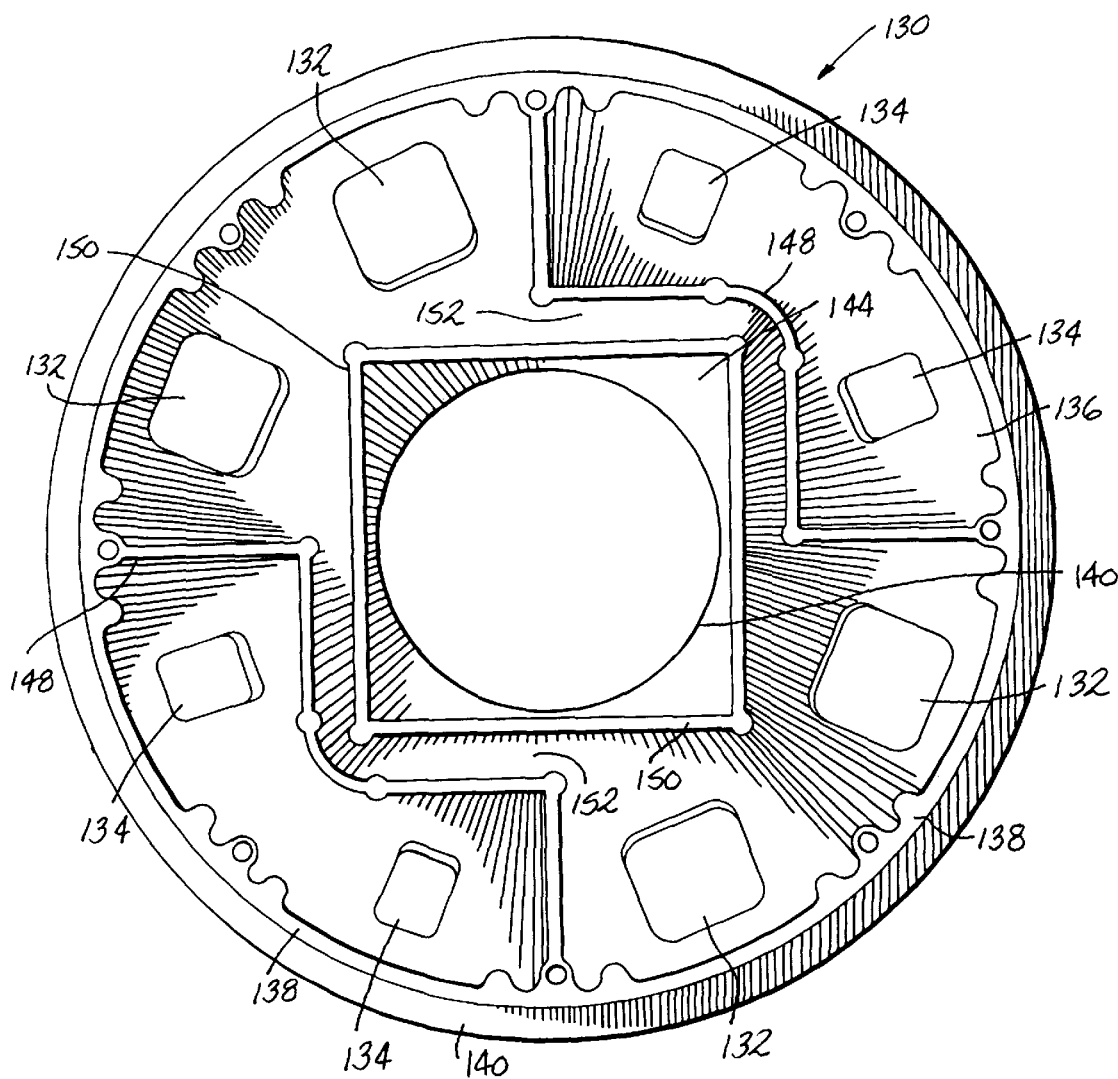
FIG. 11 is an underside view of a power and data module according to a sixth embodiment of the invention.

FIG. 11 illustrates, in partial form, an underside view of a power and data module 130 according to a still further embodiment of the invention. For purposes of simplicity and illustration, actual power receptacles and data receptacles are not shown within the view of FIG. 11. Instead, only the housing apertures for these receptacles are illustrated.

More specifically, with reference to FIG. 11, the power and data module 130 includes a plurality of power receptacle apertures 132, with two receptacle apertures 132 situated in opposing relationship to each other, so as to form a pair of power receptacle apertures 132. Intermediate the spacing of each pair of power receptacle apertures 132 are pairs of data receptacle apertures 134. As with the other embodiments shown herein, the power receptacle apertures 132 and the data receptacle apertures 134 are positioned on a hemispherical housing portion 136. Although the housing portion 136 is shown as hemispherical, numerous other shapes having a plurality of sides, such as truncated pyramids, cones and the like may be employed without departing from the novel concepts of the invention. Of particular importance is that the power and data receptacle apertures are accessible from all sides of the module 130.

Further with respect to the module 130, the module 130 may include a depending cylindrical housing portion 138 which depends downwardly from the housing portion 136. A horizontal support flange 130 extends between a lower circumferential edge of the hemispherical housing 136 and an upper circumferential edge of the cylindrical housing 138. The housing portion 138 is adapted to fit within an appropriately sized opening in a conference table, desktop or the like (not shown in FIG. 11). The support flange 140 is adapted to rest on a horizontal surface (not shown) when the power and data module 130 is installed.

In the particular embodiment shown in FIG. 11, the hemispherical housing portion 136 includes a rectangular or square aperture 142 extending through the inner portion of the area beneath the hemispherical housing 136. A flange 144 is formed at the top of the hemispherical housing 136, so that the actual opening extending through the hemispherical housing 136 is circular in shape, as shown by the perimeter 146.

In addition to the foregoing, the module 130 also includes a pair of opposing flanges 148 which are preferably integrally molded or otherwise formed so as to attach to the underside surface of the hemispherical housing 136 and are further attached to the inner side of the cylindrical housing 138. The flanges 148, in combination with sides 150 forming the rectangular aperture 142 form a pair of channels 152. The channels 152 may be utilized for purposes of running wires or other types of conductors among the power and data receptacles, and further between power/data receptacles and other "power-using" or "power-providing" apparatus.

As illustrated in FIG. 4, power and data modules 40 and 50 are installed on a horizontal work surface 18, such as a conference table 19. However, any of the power and data modules 10, 40, 50, 70, 90 and 130 can be installed on the work surface in any combination, depending on the particular needs of the end users. An opening (not shown) is formed in the work surface for each module. The opening preferably extends through the work surface and is sized for snugly receiving the cylindrical housing portion 14, 76, 96. The power and data modules may be of different sizes and have different numbers of power and data receptacles. For example, the power and data module 10 may have as few as two opposing power receptacles and two opposing data receptacles and may have as many power and data receptacles as desired. The openings in the work surface may therefore be of different sizes, depending on a particular power and data module that is to be positioned at a particular location. A plurality of portable computers 110 are positioned at various locations around the conference table 19 with power cables 24 and data lines 28 connected between the computers 110 and an adjacent power and data module. A cable 112, such as a parallel or serial cable connected to a computer 110 is directed through the central opening 44 in the power and data module 40. The cable can be connected to a remote device, such as a facsimile machine, scanner, printer, etc. Likewise, a printer or other electrical device 114 can be attached to a power and data module in the same manner as the computers 110. A cable 112 is shown as passing through the aperture 54 in the power and data module 50. The cable 112 may connect the printer to one or several of the computers 110. A power cord 24 extends from the printer and is connected to one of the power receptacles 20 in module 50. With this arrangement, power and data receptacles are conveniently located adjacent to electrical equipment arranged around the modules thus preventing unsafe, unsightly, and distracting cable arrangements.

It will be apparent to those skilled in the pertinent arts that other embodiments of multi-user electrical service power centers in accordance with the invention may be designed. That is, the principles of the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

I claim:

1. A multi-user electrical services module comprising:

a housing portion having a hemispherical configuration forming a dome-like external surface;

a plurality of power receptacles positioned on said housing portion and accessible from opposite sides of said module, so as to provide electrical power transfer capabilities;

a plurality of data outlets positioned on said housing portion and accessible at least from opposite sides of said services module, so as to provide data transfer capabilities; and means for supporting, in a stable manner, said services module on a top side of a work surface, said services module fitting within an opening in said work surface.

* * * * *